United States Patent [19]
Patton et al.

[11] Patent Number: 5,943,121
[45] Date of Patent: Aug. 24, 1999

[54] ADAPTER FOR USE WITH A PHOTOGRAPHIC PROCESSING ASSEMBLY

[75] Inventors: David L. Patton, Webster; Allen K. Tsaur, Rochester; Ralph L. Piccinino, Jr., Rush; Jerry Carmen, Spencerport; Kevin H. Blakely, Rochester, all of N.Y.

[73] Assignee: Eastman Kodak Company, Rochester, N.Y.

[21] Appl. No.: 09/013,555

[22] Filed: Jan. 26, 1998

[51] Int. Cl.[6] .............................. G03B 27/62; G03D 3/08; G03D 13/04
[52] U.S. Cl. .......................... 355/75; 396/612; 396/638; 355/27
[58] Field of Search .................................. 396/594, 595, 396/599, 612, 638; 355/27–29, 75

[56] References Cited

U.S. PATENT DOCUMENTS

| | | | |
|---|---|---|---|
| 3,776,119 | 12/1973 | Slingsby et al. | 396/582 |
| 3,873,988 | 3/1975 | Pfeifer et al. | 396/622 |
| 4,218,123 | 8/1980 | Viehrig et al. | 396/594 |
| 4,362,376 | 12/1982 | Otani | 396/615 |
| 4,363,548 | 12/1982 | Oberhoffner et al. | 396/568 |
| 4,406,534 | 9/1983 | Viehrig et al. | 396/612 |
| 4,555,632 | 11/1985 | Vockenhuber | 250/599.02 |
| 4,719,483 | 1/1988 | Yamazaki | 396/594 |
| 4,742,216 | 5/1988 | Morse et al. | 396/595 |
| 4,743,928 | 5/1988 | Young | 396/594 |
| 4,760,417 | 7/1988 | Zwettler et al. | 396/620 |
| 4,843,430 | 6/1989 | Huber et al. | 396/599 |
| 4,967,222 | 10/1990 | Nitsch | 396/616 |
| 5,373,338 | 12/1994 | Yamaguchi et al. | 396/612 |
| 5,434,643 | 7/1995 | Ishikawa et al. | 355/27 |
| 5,555,066 | 9/1996 | Benker | 396/613 |

FOREIGN PATENT DOCUMENTS

| | | |
|---|---|---|
| 3014784 | 12/1984 | Germany . |
| 4033367 | 4/1992 | Germany . |
| 502014 | 3/1939 | United Kingdom . |
| 867055 | 5/1961 | United Kingdom . |
| 1367443 | 9/1974 | United Kingdom . |
| 2041567 | 9/1980 | United Kingdom . |

*Primary Examiner*—D. Rutledge
*Attorney, Agent, or Firm*—David A. Novais; Frank Pincelli

[57] ABSTRACT

An adapter for use in a processing assembly can interface paper in magazines or cassettes from external printers with a minilab printer so that the paper printed externally can be processed using the minilab's processor and the processor's replenishment system. The adapter which includes a light-tight feed slot is configured to receive a cassette thereon and the adapter can be mounted onto the processing assembly. When mounted on the processing assembly the adapter along with the feed slot forms a light-tight path from the cassette to the printer. Printer functions such as backmarking, printing, punching, etc. can be deactivated during use of the adapter, and photosensitive material which enters the printer through the feed-slot of the adapter will follow the printing path of the printer and thereby trigger checks which are utilized to control replenishment in the processor of the processing assembly. With this arrangement, photosensitive material or paper which does not require the printer functions of the printer, such as paper that has been printed at an external printer, can be fed into the printer to follow the normal printing path. Since the paper follows the normal printing path, checks within the printer such as paper size and/or width are triggered via signals and these signals are utilized to provide for correct replenishment in the processor.

19 Claims, 5 Drawing Sheets

ADAPTER FOR USE WITH A PHOTOGRAPHIC PROCESSING ASSEMBLY

CROSS REFERENCE TO RELATED APPLICATIONS

This application is related to U.S. Ser. No. 08/628,215 filed Apr. 4, 1996, of Anthony Earle and John Rosenburgh.

FIELD OF THE INVENTION

The present invention relates to an adapter for use with a processing assembly as well as a processing method. The adapter can interface with a printer of the processing assembly, so that paper printed externally can be processed using a processor of the processing assembly and the processor's replenishment system.

BACKGROUND OF THE INVENTION

One type of photographic processing assembly is known as a minilab. A typical minilab has three sections. The first section is a printer where negatives are exposed to photographic paper to record latent images on that paper. The exposed photographic paper is then fed into the second section, or processor. In the processor, the paper is treated with processing chemicals to develop the latent images so as to produce stable prints. The stable prints are then fed to the third section of the minilab, the dryer, where excess moisture is removed from the prints. As the exposed paper is being developed in the processor, the processing chemicals are consumed and have to be replenished.

One of the major advantages of a minilab of the type described above, is its simplicity of use. Essentially, provided that the machine is set up correctly and operating correctly, all an operator needs to do is feed photographic negatives into the printer and remove finished prints from the dryer. The operator does not need to handle anything other than the negatives and the finished prints. The processing of the negatives into prints can be highly automated allowing relatively unskilled operators to work the machine. This advantage, however, is in some respects a disadvantage. A minilab lacks flexibility, since it is dedicated to producing prints from photographic negatives and cannot be used to produce prints from other sources such as a photo-CD or an electronic camera.

The above-noted co-pending U.S. application Ser. No. 08/628,215 addresses this drawback by providing for an adapter that allows an existing minilab to accept paper from other printing devices without having to make any modifications to the minilab. This adapter allows a roll or web of exposed photographic paper to be fed from a cassette or magazine directly onto the processor via an entry to the processor which is separate from an entry to the printer. This processor entry can be the test strip feed slot of the processor. The paper stored in the cassette of co-pending application Ser. No. 08/628,215 may have been exposed to images from various sources such has photo-CDs or an electronic camera using a device such as a Kodak CRT Color Digital Printer. Because the adapter of this application utilizes the processor entry point which can be a test strip feed slot, no adjustments have to be made to the printer of the minilab.

However, a drawback to the arrangement disclosed in U.S. application Ser. No. 08/628,215 is that since the test strip feed slot which enters directly into the processor is utilized, the printing path in the printer is bypassed. During normal operation of a minilab when a printer is utilized, an unexposed paper is fed into the printer and the printer includes sensors which obtain information on the paper, such as paper size and/or width, to make sure that the paper is fed correctly. The printer further provides instructions to the processor which is downstream of the printer to control replenishment based on the obtained information on the paper. These are safeguards which provide for correct replenishment. By bypassing the printer and feeding the paper directly into the processor as taught by co-pending U.S. application Ser. No. 08/628,215, the safeguards set forth in the printer are bypassed. Therefore, there is no way to make sure that paper is properly fed and there no way to assure proper replenishment.

Furthermore, the arrangement of co-pending application Ser. No. 08/628,215 requires a leader card since the paper needs to be fed a certain amount before it is grabbed and routed through the processor.

SUMMARY OF THE INVENTION

The present invention provides for an adapter which permits both exposed and unexposed paper to be introduced into a processing assembly by way of an entrance to a printer of the processing assembly. This thereby permits the paper to utilize the printer path in the printer before the paper enters the processor.

More specifically, the present invention provides for an adapter that can interface paper cassettes or magazines from external printers with a minilab printer so that the paper printed externally can be processed using a minilab processor and the processor's replenishment system. This can be done without having to go into a dark area and transfer the paper from one cassette or magazine to a cassette or magazine designed specifically for the minilab. By utilizing the printer path of a printer, checks such as paper size and/or width which are used for controlling replenishment take place along the printer path. At the same time, by utilizing the adapter of the present invention, a user can shut off or deactivate the printer functions which take place at the printer such as back-printing, hole punching, printing, etc.

With the adapter of the present invention, a user can introduce exposed paper directly into the printer, and although printer functions are deactivated, the checks for replenishment which take place along the printer path can be performed. Therefore, after the exposed paper leaves the printer path, it enters into the processor of the processing assembly and the correct replenishment is performed.

The adapter of the present invention permits the introduction of a roll or web of exposed photographic paper or externally printed paper directly into the printer, and with the printing functions deactivated, the correct instructions for replenishment which take place along the printer path will be given to the processor for correct replenishment of the exposed photographic paper. At the same time, the adapter of the present invention can be utilized to introduce unexposed paper. In this case, the printer functions would not be deactivated and the printer and processor would function normally to produce prints from the unexposed paper.

Also, with the adapter of the present invention, it is not necessary to use a leader card to feed the paper to the printer.

The present invention provides for an adapter for use in a processing assembly. The adapter comprises a first section that is configured to receive a cassette or magazine thereon. The cassette contains a photosensitive material therein and has an opening which permits a withdrawal of the photosensitive material from within the cassette. The adapter further includes a second section that has a feed slot. The feed slot has a first side which mates with the opening on the cassette when the cassette is mounted on the first section and a second side which mates with an entrance to a printer of the processing assembly when the adapter is mounted on the printer. This forms a path for the photosensitive material from the cassette to the printer for feeding photosensitive material from the cassette to the printer.

The present invention also provides for a processing method that utilizes a processing assembly having a printer and a processor. The method comprises the steps of providing an adapter on the processing assembly such that a first side of a feed slot on the adapter mates with an entrance to the printer; providing a cassette or magazine having a photosensitive material therein on the adapter such that an opening on the cassette mates with a second side of the feed slot; and feeding the photosensitive material from the cassette to the printer through the feed slot.

The present invention also provides for a processing assembly which comprises a printer which exposes photographic negatives to photographic paper; a processor which develops the exposed photographic paper; and an adapter having a feed slot. A first side of the feed slot mates with an entrance to the printer and a second side of the feed slot mates with an opening on a cassette or magazine mounted on the adapter. The cassette contains a photosensitive material therein and the feed slot forms a passage for the photosensitive material from the cassette to the printer.

DETAILED DESCRIPTION OF THE INVENTION

Figure 1:
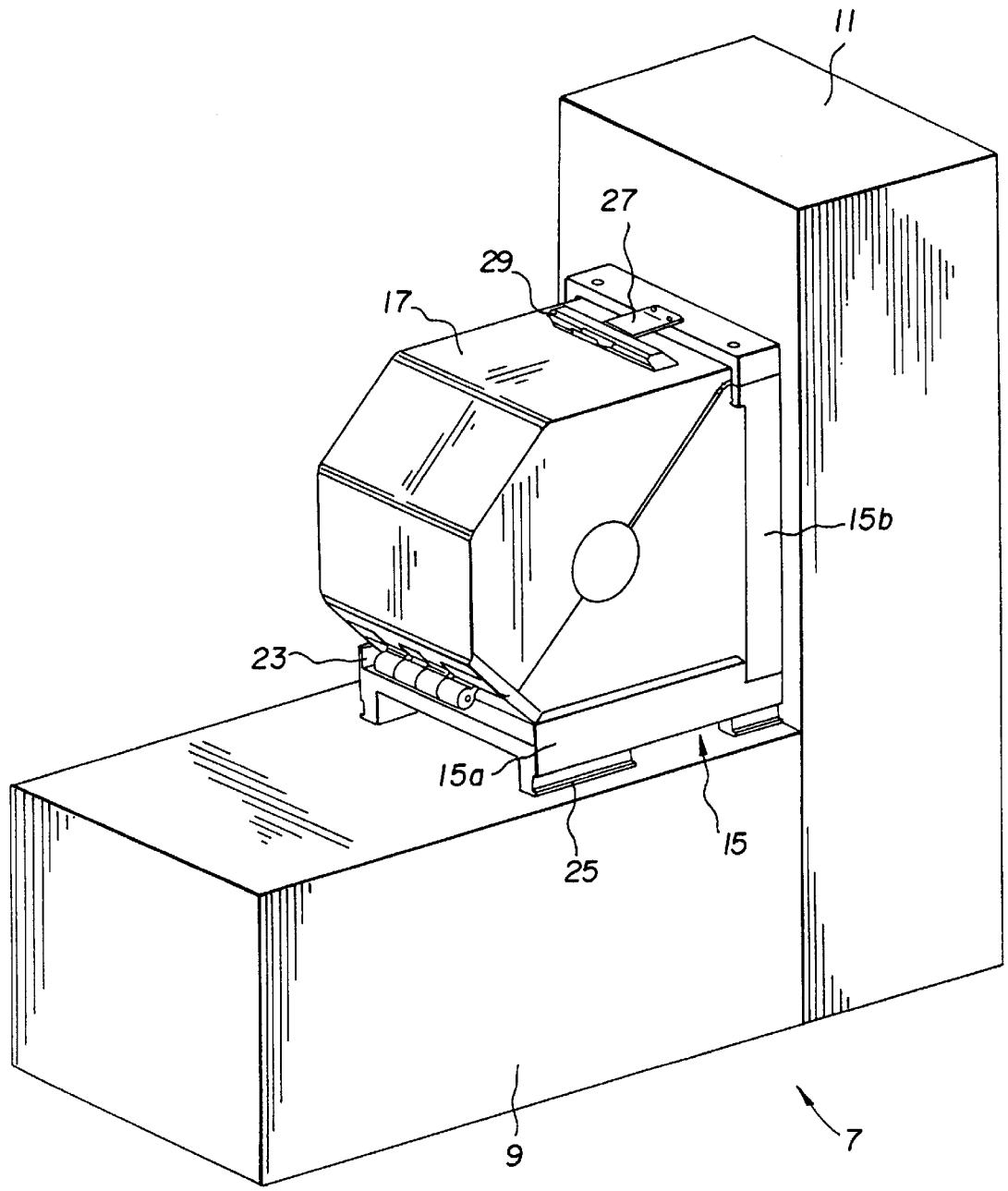
FIG. 1 is a schematic illustration showing a printer and processor of a processing assembly, with an adapter and a cassette or magazine mounted thereon.

Referring now to the drawings, wherein like reference numerals designate identical or corresponding parts throughout the several views, FIG. 1 is an overall schematic view of an adapter 15 of the present invention including a processing assembly 7 and a cassette or magazine 17. As illustrated in FIG. 1, processing assembly 7 includes a printer 11 which can expose photographic negatives to photographic paper, and a processor 9 which can develop the exposed photographic paper. Adapter 15 is mounted on processing assembly 7 such that a portion of adapter 15 is positioned adjacent to printer 11. As further illustrated in FIG. 1, cassette 17 is mounted on adapter 15. Cassette 17 could be a known cassette which contains a roll or web of unexposed or exposed photographic paper or photosensitive material (not shown).

Figure 2:
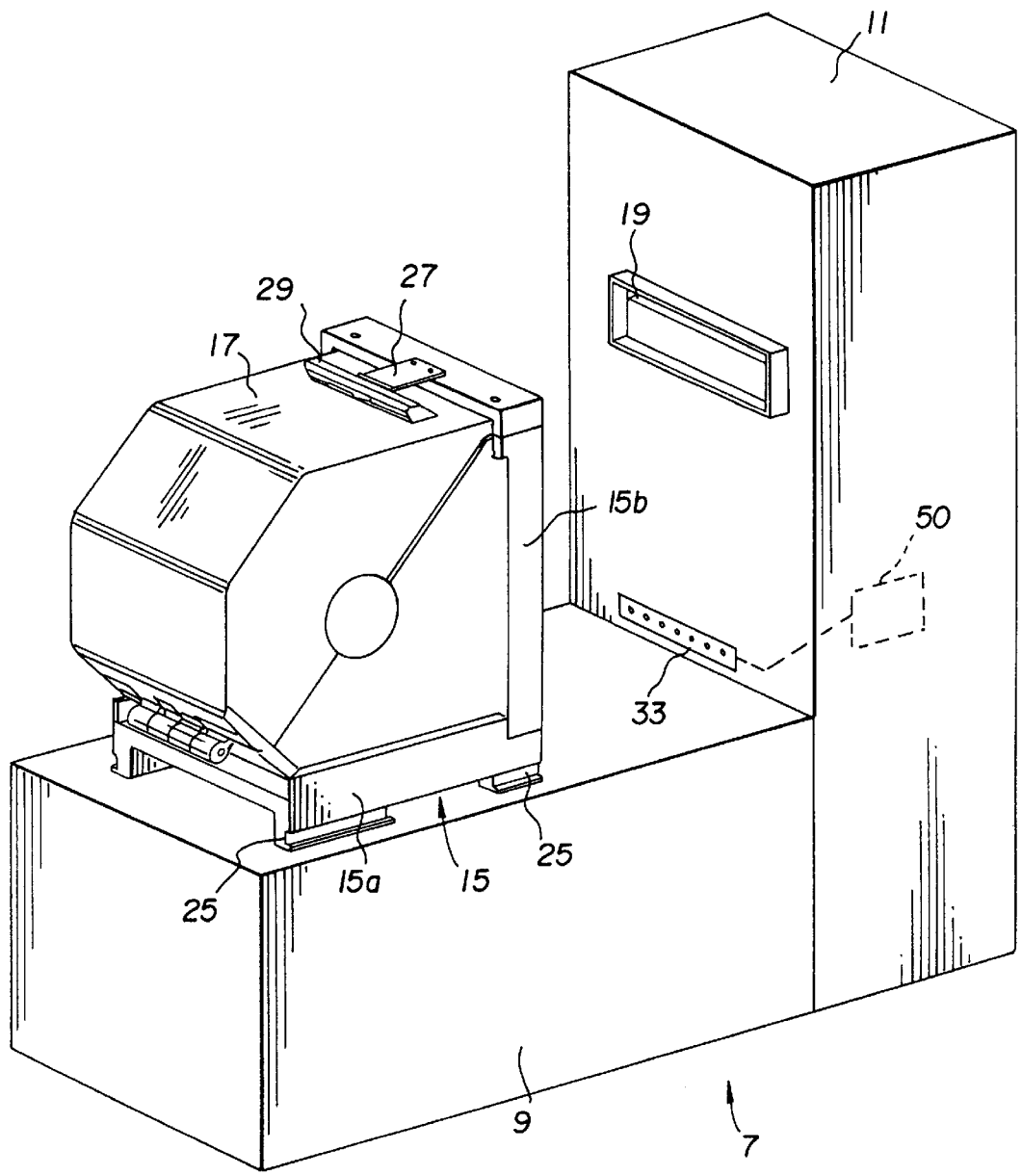
FIG. 2 is a further view showing the adapter with the cassette thereon as well as the processing assembly.

As illustrated in FIG. 2 which shows adapter 15 and cassette 17 mounted thereon spaced from printer 11, printer 11 includes an entrance 19 which can be light-tight or light-locked in a known manner.

Figure 3:
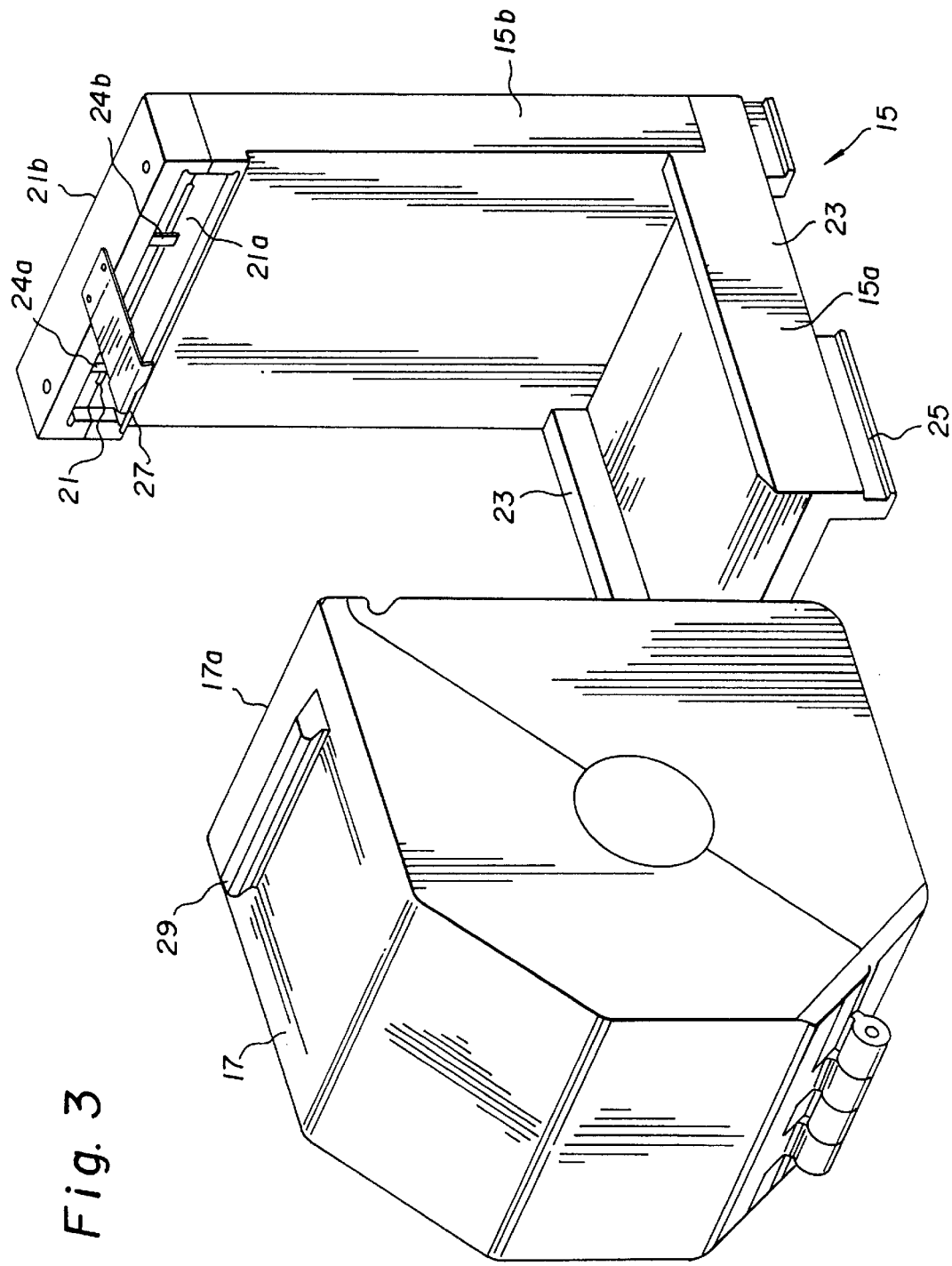
FIG. 3 is a view of the adapter of the present invention.
Figure 5:
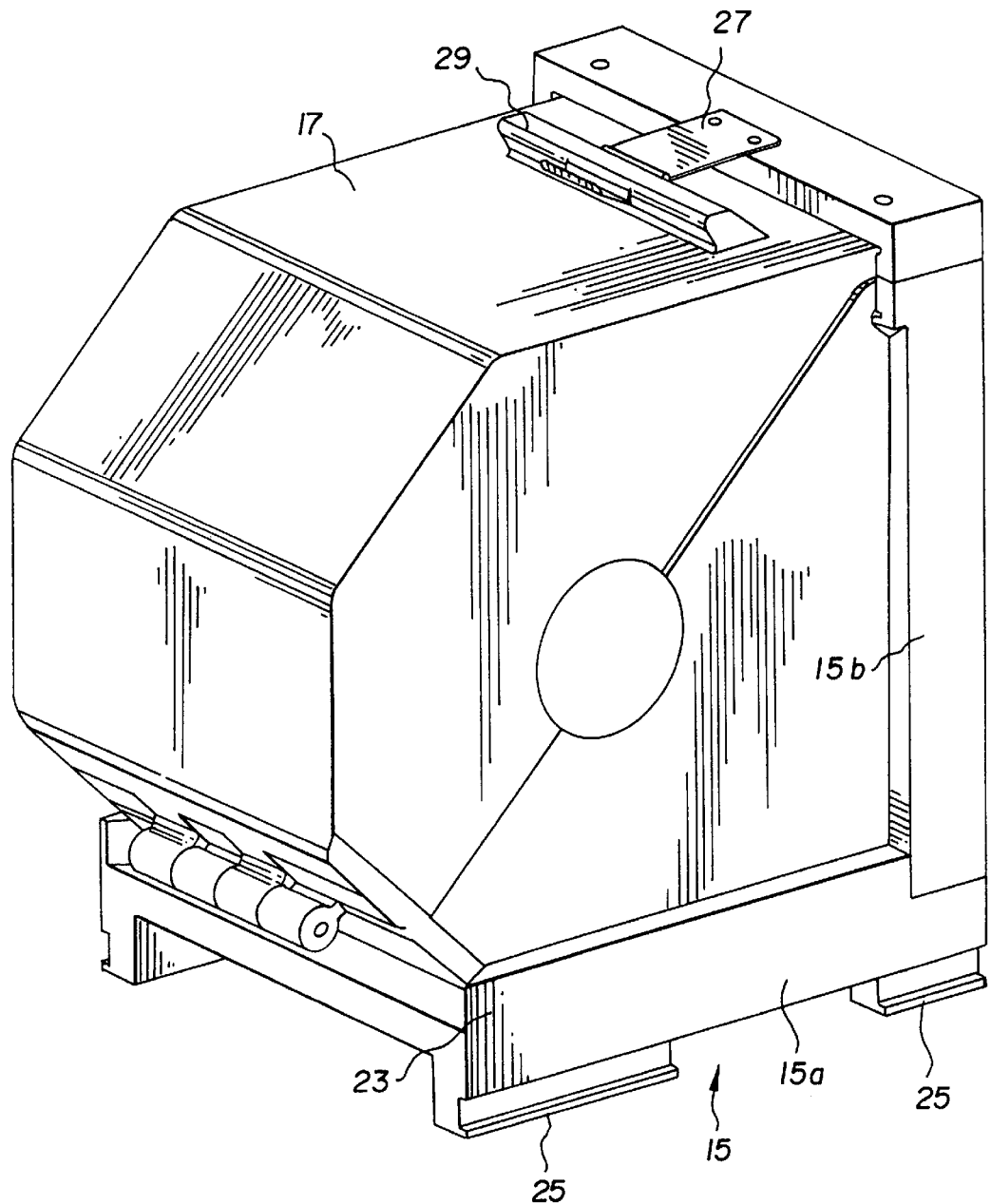
FIG. 5 is an isolated view of the adapter of the present invention having a cassette or magazine thereon.

Referring to FIGS. 3 and 5 which show further details of adapter 15, adapter 15 comprises a first section 15a and a second section 15b which extends perpendicularly from first section 15a. Sections 15a, 15b can be separate components which can be, i.e., welded together, or adapter 15 including sections 15a, 15b can be formed from a unitary body. As illustrated in FIG. 3, first section 15a includes opposing guides 23 while second section 15b includes a feed slot 21. Opposing guides 23 permit cassette 17 to be slid onto first section 15a to a position in which a paper outlet 17a on cassette 17 is in mating engagement with one side, i.e., a first side 21a of feed-slot 21. Also, entrance 19 of printer 11 corresponds to feed-slot 21 such that when adapter 15 is positioned adjacent to printer 11 so that second section 15b is positioned between cassette 17 and printer 11 (FIG. 1), the opposite side, i.e., a second side 21b of feed slot 21 will mate with entrance 19. Feed-slot 21 can be light-tight by having the recess lined with velvet plush material to ensure that the connection between adapter 15, cassette 17 and a printer 11 is light-tight.

First section 15a can also include mounting members 25 which can cooperate with corresponding members (not shown) on processor 9 for securely fastening or anchoring adapter 15 on processing assembly 7.

As further illustrated in FIG. 3, second section 15b can include a latch or locking member 27 such that when cassette 17 is mounted on adapter 15, latch 27 can cooperate with a protruding or slotted member 29 on cassette 17 as illustrated in FIGS. 1 and 2, so as to securely lock cassette 17 on adapter 15. This locking feature is not limited to the arrangement shown and it is recognized that locking member 27 can alternately be located on first section 15a or both first and second sections 15a, 15b depending on design considerations.

Figure 4:
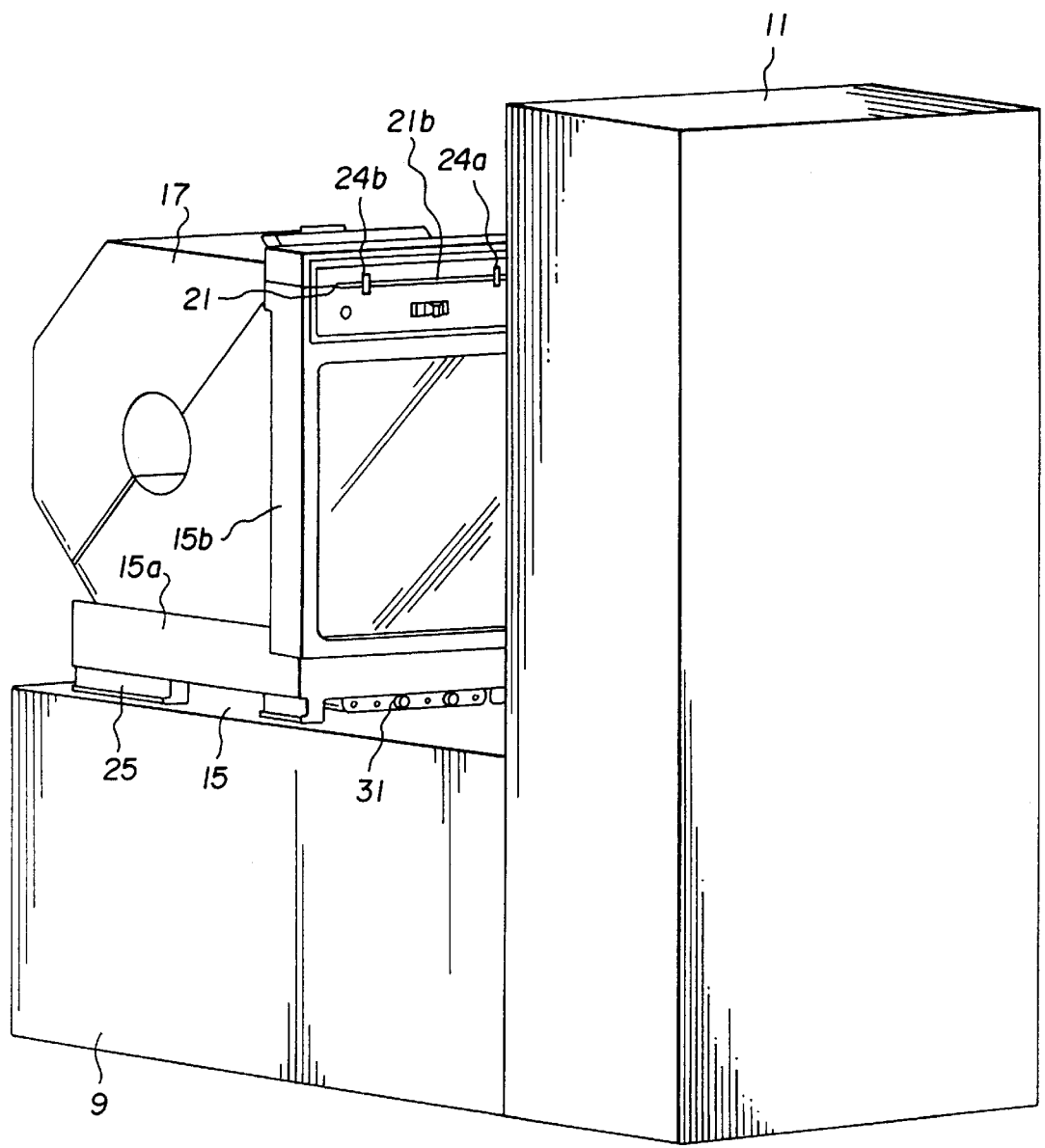
FIG. 4 is a further view of the processing assembly, cassette and adapter.

Referring to FIG. 4, adapter 15 further includes indicator members or switches 31 which interface with switches or indicators 33 (FIG. 2) provided on printer 11. Indicator switches 31 are responsive to the placement of cassette 17 onto adapter 15, and cooperate with indicators 33 to provide a signal to printer 11 indicative of the size and/or width of the photosensitive material in cassette 17 by correspondingly extending or retracting to come into and/or out of contact with indicators 33. Of course, this is just one example, and any arrangement which can provide a signal which would be indicative of the size and/or width of paper within cassette 17 can be utilized.

Indicator switches 31 as noted above interface with indicators 33 on printer 11 so as to provide a signal to printer 11 indicative of the size and/or width of paper within cassette 17 when adapter 15 with cassette 17 thereon is positioned adjacent to printer 11 as illustrated in FIG. 1. In the position of FIG. 1, feed slot 21 is in mating engagement with entrance 19 as well as mating engagement with opening 17a on cassette 17. The signal provided by the interfacing indicator switches 31 and 33 to the printer set off control operations within printer 11, by way of, for example, computer or CPU 50, to assure that the printer path in printer 11 and processor 9 are properly set for the specific size and/or width of paper in cassette 17. At the same time, this signal is sent from printer 11 to processor 9 to provide instructions by way of, for example, computer 50 for correct replenishment in processor 9 after the paper exits printer 11.

Also, when adapter 15 is positioned as illustrated in FIG. 1, signals can be sent to printer 11 to shut off printer functions such as back-marking, printing, punching, order sort markers, print cut markers, etc. In this way, paper which does not require the printing functions noted above, such as paper that has been printed at an external printer, can be fed into printer 11 to follow the normal printing path. Since the paper will follow the normal printing path, checks within the printer such as for paper size and/or width are triggered via signals by way of indicator switches 31 and 33, and these signals can be utilized to provide for correct replenishment in downstream processor 9.

As shown in FIGS. 3 and 4, feed slot 21 also includes paper edge guides 24a, 24b which are movable or adjustable in a direction transverse to a paper feeding direction. Paper edge guides 24a, 24b are movable so as to accommodate and guide paper of different sizes and/or widths which pass through feed slot 21 from cassette 17 to printer 11.

Use of the adapter and processing assembly of the present invention will now be described. First, an operator loads cassette 17 onto adapter 15 as illustrated in FIG. 5. On the other hand, adapter 15 can first be placed on processing assembly 7 and cassette 17 thereafter placed on adapter 15. Also, paper edge guides 24a, 24b are adjusted based on the size and/or width of the paper in cassette 17. Adapter 15 with cassette 17 thereon is mounted as shown in FIG. 1 such that first side 21a of feed slot 21 is in light-tight mating engagement with entrance 19 of printer 11 and second side 21b of the feed slot 21 is in light-tight mating engagement with opening 17a of cassette 17. This creates a paper path between cassette 17 and printer 11 by way of feed slot 21 to permit passage of unexposed or exposed photosensitive material or paper into printer 11. When adapter 15 with cassette 17 placed thereon is positioned as illustrated in FIG. 1, the printer functions of printer 11, such as back-marking, printing, punching, etc. can be deactivated either manually or if printer 11 is so equipped, automatically. In the position of FIG. 1, indicator switches 31 will interface with indicators 33 on printer 11 so as to provide a signal to printer 11 which is indicative of the size and/or width of the paper in cassette 17. This signal is thereby utilized by computer or CPU 50 to provide for the correct paper path and control downstream replenishment in processor 9 as the paper proceeds through the processor. Also, if necessary, adapter 15 can be equipped to inform printer 11 when no more paper is in cassette 17.

With the arrangement of the present invention, it is possible to use cassettes 17 of various sizes by simply placing mounting members or blocks on first section 15a so as to accommodate for smaller cassettes. Also, since adapter 15 can accommodate various size cassettes, it would be possible to make the cassettes easier and cheaply since the basic criteria would be that opening 17a on cassette 17 would mate in a light-tight manner with feed slot 21 of adapter 15. Also, since the cassettes can be cheaply manufactured, prepackaged paper can be placed in the cassette and a leader card is not required to insert to paper in printer 11.

Adapter 15 of the present invention permits a user to simulate a cassette which is dedicated to that printer to enable a user to use the printer path in the printer and thereby use the checks in the printer to control replenishment. At the same time, paper which does not require the printer functions of the printer, such as paper printed at an external printer, can be fed into the printer and provided with correct replenishment since the checks for replenishment and proper paper feeding will occur along the printer path.

The invention has been described in detail with particular reference to certain preferred embodiments thereof, but it will be understood that variations and modifications can be effected within the spirit and scope of the invention.

What is claimed is:

1. An adapter for use in a processing assembly, the adapter comprising:
   a first section which is configured to receive a cassette thereon, said cassette containing a photosensitive material therein and having an opening which permits a withdrawal of the photosensitive material from within the cassette; and
   a second section having a feed slot, said feed slot having a first side which mates with the opening on the cassette when the cassette is mounted on the first section and a second side which mates with an entrance to a printer of the processing assembly when the adapter is mounted on the processing assembly, to thereby form a path for the photosensitive material from the cassette to the printer for feeding photosensitive material from the cassette to the printer, said feed slot including a light tight material.

2. An adapter according to claim 1, wherein said first section comprises opposing guides for permitting a mounting of the cassette thereon in a position that the opening on the cassette mates with the first side of the feed slot.

3. An adapter according to claim 1, wherein said second section extends from said first section so as to be positioned between the cassette and the printer when the cassette is mounted on the first section and the adapter is mounted on the processing assembly.

4. An adapter according to claim 1, wherein said adapter comprises indicator switches which interface with indicators on the printer when the second side of the feed slot is mated with the entrance on the printer to provide a signal to the printer which is at least indicative of a size and/or width of the photosensitive material in the cassette, wherein replenishment in a processor of the processing assembly which is downstream of the printer is based on said signal.

5. An adapter according to claim 4, wherein said signal further deactivates printer functions of the printer when the second side of the feed slot is mated with the entrance of the printer.

6. An adapter according to claim 1, wherein at least one of the first or second sections comprises a locking member for locking the cassette on the adapter.

7. An adapter according to claim 1, wherein said first section comprises at least one mounting member which permits a mounting of the adapter on the processing assembly.

8. An adapter according to claim 1, wherein said feed slot comprises edge guides which are adjustable in accordance with a size and/or width of photosensitive material passing through the feed slot.

9. A processing method for using a processing assembly having a printer and a processor, the method comprising the steps of:
   providing an adapter onto the processing assembly such that a first side of a feed slot on the adapter mates with an entrance to the printer of the processing assembly;
   providing a cassette having a photosensitive material therein on the adapter such the an opening on the cassette mates with a second side of the feed slot; and
   feeding the photosensitive material from the cassette to the printer through the feed slot.

10. A method according to claim 9, comprising the further steps of:
   deactivating printer functions of the printer when the adapter is provided on the processing assembly;
   providing a signal to the printer indicative of a size and/or width of the photosensitive material in the cassette when the feed slot on the adapter is mated with the entrance to the printer; and
   controlling a replenishing function in the processor of the processing assembly located downstream of the printer based on said signal.

11. A processing assembly comprising:

a printer which exposes photographic negatives to photographic paper;

a processor which develops the exposed photographic paper; and an adapter having a feed slot, a first side of said feed slot mating with an entrance to said printer and a second side of the feed slot mating with an opening on a cassette mounted on the adapter, the cassette containing a photosensitive material therein and the feed slot forming a passage for the photosensitive material from the cassette to the printer, said adapter comprising an indicator switch which provides a signal to said printer indicative of a size and width of the photosensitive material in the cassette, wherein a replenishment function in the processor is controlled based on said signal.

12. A processing assembly according to claim 11, further comprising a control member which deactivates printer functions of the printer when photosensitive material is fed to said printer through said feed slot.

13. A processing assembly according to claim 11, wherein said feed slot comprises edge guides which are movable to guide photosensitive material of different sizes and/or widths through the feed slot.

14. An adapter for use in a processing assembly, the adapter comprising:

a first section which is configured to receive a cassette thereon, said cassette containing a photosensitive material therein and having an opening which permits a withdrawal of the photosensitive material from within the cassette;

a second section having a feed slot, said feed slot having a first side which mates with the opening on the cassette when the cassette is mounted on the first section and a second side which mates with an entrance to a printer of the processing assembly when the adapter is mounted on the processing assembly, to thereby form a path for the photosensitive material from the cassette to the printer for feeding photosensitive material from the cassette to the printer; and indicator switches which interface with indicators on the printer when the second side of the feed slot is mated with the entrance on the printer to provide a signal to the printer which is at least indicative of a size and/or width of the photosensitive material in the cassette, wherein replenishment in a processor of the processing assembly which is downstream of the printer is based on said signal.

15. An adapter for use in a processing assembly, the adapter comprising:

a first section which is configured to receive a cassette thereon, said cassette containing a photosensitive material therein and having an opening which permits a withdrawal of the photosensitive material from within the cassette; and a second section having a feed slot, said feed slot having a first side which mates with the opening on the cassette when the cassette is mounted on the first section and a second side which mates with an entrance to a printer of the processing assembly when the adapter is mounted on the processing assembly, to thereby form a path for the photosensitive material from the cassette to the printer for feeding photosensitive material from the cassette to the printer, where in at least one of the first or second sections comprises a locking member for locking the cassette on the adapter.

16. An adapter for use in a processing assembly, the adapter comprising:

a first section which is configured to receive a cassette thereon, said cassette containing a photosensitive material therein and having an opening which permits a withdrawal of the photosensitive material from within the cassette; and a second section having a feed slot, said feed slot having a first side which mates with the opening on the cassette when the cassette is mounted on the first section and a second side which mates with an entrance to a printer of the processing assembly when the adapter is mounted on the processing assembly, to thereby form a path for the photosensitive material from the cassette to the printer for feeding photosensitive material from the cassette to the printer, wherein said first section comprises at least one mounting member which permits a mounting of the adapter on the processing assembly.

17. An adapter for use in a processing assembly, the adapter comprising:

a first section which is configured to receive a cassette thereon, said cassette containing a photosensitive material therein and having an opening which permits a withdrawal of the photosensitive material from within the cassette; and a second section having a feed slot, said feed slot having a first side which mates with the opening on the cassette when the cassette is mounted on the first section and a second side which mates with an entrance to a printer of the processing assembly when the adapter is mounted on the processing assembly, to thereby form a path for the photosensitive material from the cassette to the printer for feeding photosensitive material from the cassette to the printer, wherein said feed slot comprises edge guides which are adjustable in accordance with a size and/or width of photosensitive material passing through the feed slot.

18. A processing assembly comprising:

a printer which exposes photographic negatives to photographic paper;

a processor which develops the exposed photographic paper;

an adapter having a feed slot, a first side of said feed slot mating with an entrance to said printer and a second side of the feed slot mating with an opening on a cassette mounted on the adapter, the cassette containing a photosensitive material therein and the feed slot forming a passage for the photosensitive material from the cassette to the printer; and a control member which deactivates printer functions of the printer when photosensitive material is fed to said printer through said feed slot.

19. A processing assembly comprising:

a printer which exposes photographic negatives to photographic paper;

a processor which develops the exposed photographic paper; and an adapter having a feed slot, a first side of said feed slot mating with an entrance to said printer and a second side of the feed slot mating with an opening on a cassette mounted on the adapter, the cassette containing a photosensitive material therein and the feed slot forming a passage for the photosensitive material from the cassette to the printer, wherein said feed slot comprises edge guides which are movable to guide photosensitive material of different sizes and/or widths through the feed slot.

* * * * *